United States Patent
Peinze et al.

(10) Patent No.: US 9,757,972 B2
(45) Date of Patent: Sep. 12, 2017

(54) SECURITY FEATURE WITH A COLOR PROGRESSION STRUCTURE FOR A VALUE PRODUCT AND/OR SECURITY PRODUCT, AND VALUE PRODUCT AND/OR SECURITY DOCUMENT HAVING THE SECURITY FEATURE

(71) Applicant: BUNDESDRUCKEREI GMBH, Berlin (DE)

(72) Inventors: Franziska Peinze, Berlin (DE); Arthur Mathea, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 14/435,224

(22) PCT Filed: Oct. 7, 2013

(86) PCT No.: PCT/EP2013/070800
§ 371 (c)(1),
(2) Date: Apr. 13, 2015

(87) PCT Pub. No.: WO2014/056832
PCT Pub. Date: Apr. 17, 2014

(65) Prior Publication Data
US 2015/0266330 A1 Sep. 24, 2015

(30) Foreign Application Priority Data
Oct. 12, 2012 (DE) .......... 10 2012 218 615

(51) Int. Cl.
*B42D 25/29* (2014.01)
*G06K 15/02* (2006.01)
(Continued)

(52) U.S. Cl.
CPC .......... *B42D 25/405* (2014.10); *B42D 25/00* (2014.10); *B42D 25/29* (2014.10); *B42D 25/36* (2014.10);
(Continued)

(58) Field of Classification Search
CPC ...... B42D 25/29; B42D 25/00; B42D 25/382; B42D 25/387; B42D 2035/14;
(Continued)

(56) References Cited

U.S. PATENT DOCUMENTS 3,474,027 A 10/1969 Vautrain et al.
5,670,839 A * 9/1997 Noma ................ C09K 11/7702
313/503
(Continued)

FOREIGN PATENT DOCUMENTS

DE 19860093 A1 7/2000
DE 102006050120 A1 4/2008
(Continued)

*Primary Examiner* — Iriana Cruz
(74) *Attorney, Agent, or Firm* — Laurence A. Greenberg; Werner H. Stemer; Ralph E. Locher (57) ABSTRACT

A novel security feature for a valuable and/or security product is formed by a pattern that is formed on at least one carrier surface and has a color progression structure that is formed with a digital printing method from pattern elements arranged in a grid. The color progression structure is produced with at least two luminescence media that exhibit spectrally different luminescences. The valuable and/or security product according to the invention has one or more product carriers and at least one security feature that is arranged on or in the product carrier or carriers.

7 Claims, 3 Drawing Sheets

(51) Int. Cl.
    *B42D 25/405*  (2014.01)
    *B42D 25/36*   (2014.01)
    *B42D 25/00*   (2014.01)
    *B42D 25/382*  (2014.01)
    *B42D 25/387*  (2014.01)

(52) U.S. Cl.
    CPC ........ *G06K 15/1878* (2013.01); *B42D 25/382* (2014.10); *B42D 25/387* (2014.10); *B42D 2035/14* (2013.01)

(58) Field of Classification Search
    CPC . G06K 15/1878; G06F 3/1292; G06F 3/1222; G06F 3/1236; H04N 1/00137; H04N 1/00188; H04N 1/00251
    See application file for complete search history.

(56) References Cited

U.S. PATENT DOCUMENTS

| | | | |
|---|---|---|---|
| 7,654,581 B2 | 2/2010 | Cruikshank et al. | |
| 8,478,080 B2 | 7/2013 | Springmann et al. | |
| 8,565,791 B1* | 10/2013 | Schilit | H04W 64/00 455/41.1 |
| 8,808,577 B2 | 8/2014 | Becker et al. | |
| 2006/0249951 A1* | 11/2006 | Cruikshank | B42D 25/351 283/92 |
| 2010/0157377 A1 | 6/2010 | Zhao et al. | |
| 2012/0043751 A1 | 2/2012 | Hersch et al. | |
| 2014/0177057 A1* | 6/2014 | Brehm | G02B 5/1847 359/567 |

FOREIGN PATENT DOCUMENTS

| | | |
|---|---|---|
| DE | 102007035592 A1 | 2/2009 |
| DE | 102008012423 A1 | 5/2009 |
| DE | 102007059747 A1 | 6/2009 |
| DE | 102008012421 B3 | 6/2009 |
| DE | 102010062032 A1 | 5/2012 |
| EP | 1719637 A2 | 11/2006 |
| GB | 2470596 A | 12/2010 |
| WO | 2009106107 A1 | 9/2009 |
| WO | 2012069536 A1 | 5/2012 |

* cited by examiner

SECURITY FEATURE WITH A COLOR PROGRESSION STRUCTURE FOR A VALUE PRODUCT AND/OR SECURITY PRODUCT, AND VALUE PRODUCT AND/OR SECURITY DOCUMENT HAVING THE SECURITY FEATURE

BACKGROUND OF THE INVENTION

Field of the Invention

The present invention relates to a security feature for a valuable and/or security product with a color progression structure and to a valuable and/or security product, in particular a valuable and/or security document or security element, containing said security feature. A valuable and/or security document can be, for example, a personal ID, in particular a passport, or a payment instrument, in particular a banknote. In the case of an identity document, the front side thereof for example carries the photograph and the name of the owner. Such documents are typically produced in standardized formats, for example in the ID-1, ID-2 or ID-3 format according to ISO 7810. The documents can be made in principle from an organic polymer or a ceramic material, paper, cardboard or metal, or can contain them. Cards and card-like constituents of book-type documents can be produced preferably from polymer films which are laminated together.

The security features incorporated in the valuable and/or security documents can serve exclusively for proving the genuineness of the products, independently of the type or user thereof. Such security features are, for example, colored fibers, guilloches, the special paper of banknotes and the like. Individualizing, for example personalizing, security features moreover contain, in coded form or also in clear writing, an item of information relating to the type of document, to the user of said document or to an object with which the document is uniquely associated. Such information can be a facial image (photograph) of the user, his personal data, such as the name, the date of birth, the place of birth, the signature and a personal identifier, such as a membership number. Another security feature individualizing the document can be, for example, a serial number of the document or the vehicle identification number of a motor vehicle with which the document is associated.

Iris print, which is produced with the relief printing or offset printing method, is a type of security feature that differs from those mentioned above (DE 10 2007 059 747 A1).

By way of example, DE 10 2006 050 120 A1 describes a method for individually marking a printing product for securing the authenticity thereof. In order to carry out this method, a printing machine having a plurality of printing mechanisms is used for printing a plurality of partial images on print sheets, wherein a plate cylinder or a forme cylinder in at least one printing mechanism of the printing machine has a controllable drive. Predetermined values for position control/regulation are continuously adjusted for at least one controllable drive of a plate or forme cylinder of one of the printing mechanisms, such that the position of the respective printing image on the print sheet is continuously varied in a defined manner.

DE 10 2008 012 423 A1 furthermore specifies a polymer layer composite made of a plurality of polymer layers having a colored security feature, wherein one item of information is decomposed into a plurality of print extracts which in each case comprise one information part and which are printed in a manner such that they are matched to different substrate layer surfaces. Color transitions can be integrated into this information, for example iris print. To this end, the image points of a first color can be printed in one print extract, and the image points of a second color can be printed in a further print extract. The various print extracts are printed on the substrate layer surfaces using a digital printing method, for example an inkjet printing method.

DE 10 2008 012 421 B3 furthermore describes a valuable and/or security document having a monolithic document body. A security feature which comprises a fine line pattern is applied onto at least one of the substrate layers of said document body. Said security printing pattern is divided into at least two print extracts which complement one another such that, during the printing of each of the print extracts, in each case one portion of at least one fine line is printed. The at least two print extracts are printed with at least two different printing methods. At least one of the print extracts is produced with an inkjet printing method and at least one further print extract is produced with a wet offset or waterless offset printing method.

However, there is a constant need for novel, in particular individualizing, security features, for example personalizing, security features which are secured against forgery and/or falsification and/or copying and are easily identifiable by a person for the purposes of associating the information coded therewith with the user and/or the object. The security feature should preferably be located in an internal product sheet which is secured against forgery and/or falsification and/or copying. The present invention moreover specifies the essential further object of providing an, in particular individualizing, security feature that is cost-effective, easy and quick to realize. One disadvantage of conventional manufacturing methods for luminescent pictures of people and other patterns is that there is currently a lack of availability of raw materials that are suitable for this purpose, such as pigments, and of the corresponding printing paints for a printing process and of the necessary auxiliary means for calibrating the individual colors or also for the print of all colors, as is made possible by the color management for CMYK colors or RGB displays.

To the extent that the term "valuable and/or security product" which can be in particular a valuable and/or security document or a security element is used in the description and in the claims of the present application, it refers to a passport, identity document, driver's license or another ID card, or an access passport, a vehicle registration document, vehicle title document, visa, check, payment instrument, in particular a banknote, a check card, bank card, credit card or cash card, customer card, health card, chip card, a company ID, credentials, membership ID, gift card or shopping voucher, bill of lading or other credentials, revenue stamps, postal stamps, ticket, (gaming) chips, sticky label (for example for securing products) or another ID document for example. A security element that has the security feature according to the invention and can be connected in a non-detachable manner with the document, such as a sticker, a label or the like, is also to be understood as a product according to the invention. The product can be, for example, a smart card. The security and/or valuable document can be present in the ID-1, ID-2, ID-3 or in another format, for example in the form of a booklet, as in the case of a passport-like object. A security and/or valuable product is generally a laminate of a plurality of document sheets, which are connected to one another areally in accurate alignment under the action of heat and increased pressure. These products should meet the standard requirements, for example ISO 10373, ISO/IEC 7810, ISO 14443. The product sheets consist, for example, of a carrier material suitable for lamination.

To the extent that the description and the claims of the present application mention the term "security feature", this term is understood to mean, according to the present invention, the optical impression effective on an observer, which is produced by a luminescent pattern of luminescent pattern elements that are disposed in a relative arrangement with respect to one another. The security feature can be produced as a constituent part of a valuable and/or security document or as a separate product (security element). The latter can be adhesively stuck, for example, onto the document. The security feature will generally only cover part of the surface of the document.

To the extent that the description and the claims of the present application mention the term "luminescence", this is understood to mean fluorescence, phosphorescence, specifically both with Stokes and anti-Stokes shift. According to the present invention, this means photoluminescence.

To the extent that the description and the claims of the present application mention the term "pattern", this is understood to mean a distribution of any type of elements that can be perceived by the human eye, preferably in a two-dimensional arrangement on one or more surfaces, which form a representation that is closed in itself, for example an image, image element, character, in particular an alphanumeric character, a symbol, emblem, a line, formula or the like. A uniform, non-structured surface that is luminescent in only one color is also to be understood as a pattern within the meaning of the present invention. This surface can contain an item of information for example by way of the color thereof.

To the extent that the description and the claims of the present application mention the term "pattern element", this is understood to mean a constituent part/element of a pattern (pixel). A pattern element serves as the smallest structural element for forming the pattern, with all pattern elements forming the pattern. The material forming a pattern element can be transparent, translucent or opaque. Furthermore, it can exhibit a specific brightness (absorption, remission), i.e. it can have for example a blackening, gray hue or white hue, and/or it can have a (spectral) coloration and therein in turn a specific brightness. The pattern elements can have a circular (dot-like), rectangular, square, hexagonal or another shape. Pattern elements can be the smallest elements of a perceivable representation, with which in each case one of the color values or color tones can be associated in a color space (additive RGB color space).

BRIEF SUMMARY OF THE INVENTION

The object on which the present invention is based is achieved by the security feature according to the invention for a valuable and/or security product and by the valuable and/or security document according to the invention which contains at least one of the security features according to the invention. The present invention also relates to a manufacturing method for the valuable and/or security product and to a method for authenticating the valuable and/or security product.

The security feature is formed by a pattern that is formed on at least one carrier surface and has a color progression structure, for example an iris. The color progression structure is formed from pattern elements that are arranged in a grid, i.e. in regular arrangement. To this end, a digital printing method is used. The color progression structure is produced in a manner according to the invention with at least two colorants that exhibit spectrally different luminescence, specifically luminescence means.

Thus, a solution was found for representing a pattern in multiple colors under excitation conditions for luminescence, without a complicated material development being necessary. By way of rastering the pattern into pattern elements, which can be realized using a digital printing method, the color progression structure can be formed by the colors being resolved in the transition region. It is additionally possible using the digital printing method to quickly realize individualizing security features. The simple representation of an iris in digital print using rastering permits quick production of an attractive security feature.

Using the color progression structure, a security feature that is visible with the eye under luminescence illumination conditions, for example in the form of a portrait picture of a person, in particular the document owner, is formed. Such luminescence illumination conditions are present if electromagnetic radiation which is suitable for exciting the security feature to luminescence, for example UV light, is incident thereon. In this case, light in the visible spectral range does not need to fall onto the security feature, although it may. The security feature can appear colorless, gray or white under normal illumination (comprises only light in the visible spectral range).

However, the appearance of the security feature that is perceivable under normal illumination conditions depends on the type of the luminescence means used: if said luminescence means absorb light only under the illumination conditions that are suitable for excitation to luminescence, they are for example transparent or translucent in the visible spectral range. Only light scattering or light refraction produced by the printing layer can in this case lead to the visual perception thereof, which, however, does not bring about a color impression—except in the case of light diffraction (when the size of the pattern elements is in the region of the light wavelength). If, on the other hand, luminescence means are used that also absorb in the visible spectral range, the security feature is, under normal illumination, colored.

The luminescence means can be any desired compositions according to the present invention, as long as they are suitable for carrying out a digital printing method. This also includes liquid (printing inks), paste-like and viscous (printing paints) and solid (dry) formulations (paint powder, toner).

The color progression structure is characterized by transitions between at least two different luminescence colors, wherein what is to be understood by different luminescence colors are different color tones of luminescence and/or different brightnesses of a color tone. As such, the spectral difference between the luminescence means and the luminescence colors thereof extends both to different color tones of luminescence and also to different brightnesses of the luminescence, with a combination of these two degrees of freedom likewise being conceivable. The spectral difference between the luminescences must be capable of being directly visually perceived by an observer. Otherwise, a color progression structure would not be conceivable.

The color progression structure is characterized by a continuous transition from a first luminescence (basic) color (for example red, green or blue according to the RGB color space or mixtures of these colors, for example of yellow, orange and/or violet) to a second luminescence (basic) color, and then possibly to a third, then possibly to a fourth color and so on. Located between two pure luminescence (basic) colors, which are formed only by pattern elements of one type, is a color transition which is characterized by respective mixed colors (mixing of the luminescence (basic) colors). Said mixed colors are in each case additively produced, because the (basic) colors that form them are produced by luminescence.

The color progression structure is produced by a prespecified rastered arrangement of pattern elements of a first luminescence means with a first luminescence color and of pattern elements of a second luminescence means with a second luminescence color in one printing plane on a printing material, specifically on at least one surface of the product carrier. If appropriate, pattern elements of a third luminescence means, pattern elements of a fourth luminescence means and so on may also be present. The color progression structure is thus formed from at least two types of pattern elements which are produced in each case with one of the at least two luminescence means. Since the individual pattern elements cannot be perceived directly with the human eye without technical aids on account of their small dimensions (for example their size may be 10 to 100 µm, preferably 30 to 75 µm), but are rather detected as clusters of a plurality of adjacent pattern elements on account of the insufficient resolution capability of the human eye, in each case a mixed color of the pattern elements that form said clusters is perceived. An arrangement of pattern elements of a plurality of types with different luminescence colors thus gives a visually perceivable impression which corresponds, with suitable arrangement of the pattern elements, to the color progression structure according to the present invention.

The security feature according to the invention can be either an individualizing, for example personalizing, feature or a non-individualizing feature. If the security feature is a non-individualizing security feature, it may be for example the emblem or logo of the authority issuing the document. If, however, the security feature is a personalizing security feature, it may for example reproduce the facial image of the document owner. In principle, other motifs, such as an emblem or a logo, are of course also conceivable. By way of example, the facial image therefore appears according to the invention under illumination conditions that are permitted by a luminescence of the pattern elements. By representing the facial image using a color progression structure, this appears altered, because it is reproduced in two or more different luminescence colors and the mixed colors thereof that transition into one another, and specifically in the form of a luminous image with the contour of the head or face and with head or face details. In principle, any desired patterns, such as image motifs, that are reproduced with a color progression structure are, of course, conceivable.

The luminescence color of the pattern changes in particular continuously within the color progression structure, i.e. without a noticeable "color jump", which would be characterized by a demarcation line between two color areas with different luminescence colors. For the continuous color transition, the color changes along a single color progression direction or alternatively in a plurality of, for example two, three or more, color progression directions in the pattern plane. Two color progression directions can for example be arranged perpendicular to one another. When compiling a color landscape that is characterized by isochromes, i.e. places of the same luminescence color represented by lines, in the pattern plane, the color progression directions extend locally perpendicular to the isochromes. In the case of a transition of a first luminescence color to a second luminescence color between two luminescence fields with uniform luminescence color that are located adjacently and parallel, the isochromes likewise extend parallel with respect to one another, specifically parallel to the luminescence fields, and the color progression direction perpendicular thereto from the first luminescence field to the second. The color progression structure, however, need not necessarily be located between two finitely extended luminescence fields of a first and a second luminescence color. Instead, the luminescence color of the pattern can change at any location along the color progression direction; in this case, the luminescence fields in the color progression direction would be arbitrarily narrow. By way of example, the color progression structure can consist of parallel color bands of the same luminescence color with parallel isochromes, wherein the isochromes can run either in a straight or a curved line, for example along zigzag lines or sine curves or the like. Alternatively, the color progression direction may also be curved, for example along a spiral. The isochromes can also extend along lines of equal density (lines having the same blackening) of a motif that transforms into a black-and-white representation. As a result, the motif with its motif details can be reproduced using the color progression structure. If furthermore two color progression directions extend perpendicular to one another, the result is nested squares or rectangles in each case of the same color if the isochromes extend rectilinearly. And for example in the case of a multiplicity of color progression directions starting from a central point, the result is nested circles or ellipses of in each case the same luminescence color, in the center of which is a region in a first luminescence color, and at the periphery of which is a region of a second luminescence color. In all cases, however, the regions of identical luminescence color are preferably practically infinitesimally narrow, wherein the smallest possible unit region is formed by in each case one pattern element. Instead of a color progression structure with a color progression from a first luminescence color to a second luminescence color, it is also possible to realize a color progression from the first luminescence color via the second luminescence color to a third luminescence color, or a color progression from a first luminescence color to a second luminescence color, and then back to the first luminescence color and so on. Any desired other configurations are also possible.

In order to produce the luminescence colors, the luminescence means are excited with electromagnetic radiation that is in each case suitable for luminescence generation. In one preferred further development of the present invention, the luminescence means can be configured to be luminous in the visible spectral range due to excitation with UV radiation. In principle, excitation with IR radiation and luminescence in the visible spectral range is also possible. In this case, the luminescence would have to be present with anti-Stokes shift for it to be in the visible spectral range. The excitation radiation can be narrowband (spectral bandwidth<25 nm) or broadband (spectral bandwidth≥25 nm). By way of example, linear excitation at 254 nm, 312 nm or 365 nm can be used if the excitation light is UV radiation. Herefor in each case suitable luminescence materials must be found which are used in suitably formulated luminescence means.

The pattern elements are preferably produced using a printing method. Herefor, a printing template that corresponds to the raster of the color progression structure must be produced. A digital printing method has the advantage that individualizing, for example personalizing, patterns can be represented flexibly, quickly and without much expenditure. Therefore, this method can be used, for example, for applying the personal data and the facial image of the person who owns a valuable and/or security document, for example personal ID or a passport. To this end, blank documents or other preliminary products which, for example, do not already have individualizing security features that serve for authenticating the document must be provided with the respective personalizing information relating to the person. This information can be applied easily in and/or on the document using the digital printing method.

The digital printing method can be a contactless (non-impact) printing method, such as an inkjet printing method, or a contact printing method, such as a transfer printing method, such as a xerographic printing method. The color progression structure is preferably produced using an inkjet printing method.

The advantage of the security feature according to the invention is that it can be produced with a very precisely defined layout and can be imitated therefore only with extremely great expenditure. The color progression is defined very exactly by the rastered arrangement of individual pattern elements with defined color and defined position, such that any examination of the security feature would automatically uncover a forgery or falsification. This is because, if no data for the layout is available, it is practically impossible to imitate the exact distribution of the pattern elements with the respective color thereof. It would also be necessary for an imitation to copy the color distribution of the color progression structure in its arrangement relative to the motif of the pattern. Moreover, by using suitable luminescence means with which the pattern is produced, imitation is made even more difficult since the identity thereof and not just the luminescence color impression that is perceivable by the human eye would also likewise have to be imitated. This is because the same color impressions can be produced in the luminescence means by different luminescence means, even if they have different luminescence spectra (metameric luminescence means). Therefore an otherwise perfect imitation could likewise easily be uncovered by spectral analysis.

In order to produce the valuable and/or security document according to the invention, first (a) a product carrier of the valuable and/or security product according to the invention, which may also be a preliminary product of the valuable and/or security product, is provided, and (b) subsequently the pattern is produced, preferably using the digital printing method, with the color progression structure using the at least two different luminescence means on at least one of the surfaces of the product carrier or carriers. To this end, the individual luminescence means are printed successively with the required layout onto the product carrier or carriers. If the product carrier or carriers is/are a preliminary product for the valuable and/or security product, it/they can then be bonded with further product carrier sheets or be coated with a curing liquid formulation, such that the surface or surfaces provided with the pattern having the color progression structure is/are arranged internally in the valuable and/or security product.

For checking the genuineness of the valuable and/or security product according to the invention using the security feature according to the invention, (a) initially the product with the security feature is positioned in an apparatus that is suitable herefor, and (b) the security feature of the product is then illuminated under the influence of electromagnetic radiation, for example with UV light, and the security feature is viewed in the form of luminescence light emitted in the visible spectral range. This either includes direct viewing by the person or machine viewing using apparatuses and image evaluation systems that are suitable herefor. An apparatus suitable for the authentication has a holder for the product and a light source for electromagnetic radiation for the excitation of the luminescence means, for example a UV light source. Furthermore, a suitable optical unit and capturing and/or evaluation systems can also be provided. The authentication can be deemed successful if the pattern forming the security feature is perceived by the human eye under luminescence illumination conditions and shows the envisaged color progression structure. On closer examination of the product, it is further possible to check and verify also the pattern element distribution in the pattern using a magnifying optical unit.

In one preferred development of the present invention, the luminescence means contain in each case at least one luminescence substance. Luminescence substances that can be used are in particular substances or substance mixtures that cause a luminescence color shade. Each of the luminescence substances has its own emission spectrum that accounts for its color shade. The light emission of the luminescence means can be narrowband (light with an emission having a peak width at half height of <25 nm) or broadband (peak width at half height of ≥25 nm).

Organic or inorganic luminescence substances can be used as the luminescence means. It is possible to use pure luminescence substances or mixtures of luminescence substances. The mixtures can contain either at least two inorganic luminescence substances or at least two organic luminescence substances or at least one inorganic and at least one organic luminescence substance. Typical luminescence substances are specified for example in U.S. Pat. No. 3,474,027 A, DE 198 60 093 A and DE 10 2007 035 592 A1, the disclosure contents of which are hereby incorporated in their entirety in the present specification. These are for example pigments, for example materials doped with rare earths (luminophores), which form a host lattice for the luminophores, wherein in particular substances doped with terbium, cerium and/or europium, such as oxysulfides and oxynitrides, are used. The pigments formed therewith can be enveloped additionally with organic substances so as to increase the quantum yield of the luminescence. In principle, organic luminescence substances are also usable, such as rhodamine 6G or fluorescein. The luminescence means can moreover contain further substances, such as binders, solvents, additives and auxiliary agents, which are common in colorants for printing methods. In this respect, reference is made by way of example to DE 10 2008 012 421 B3, the disclosure content of which, in particular with respect to the composition of an inkjet printing ink, is hereby incorporated by way of example in the present specification in its entirety.

In another preferred development of the present invention, the color progression structure is formed by in each case a quantity of the luminescence means per unit area of the carrier surface or surfaces that substantially continuously changes in the direction of the color progression.

In particular, the luminescence means quantity per unit area of the surface or surfaces of the product carrier/carriers can be adjusted by way of at least one of the following parameters: the size of the pattern elements, the quantity of the luminescence means per pattern element (concentration of the luminescence means in the pattern element), and the spacing between the pattern elements (distance between the center points of two neighboring pattern elements). By way of example, it is possible, for example, in the transition region between two luminescence colors, which transition region is produced with two different luminescence means, i.e. a luminescence means of a first type and a luminescence means of a second type, to reproduce a dimming luminescence color of one of the two luminescence means by way of decreasing the size of the corresponding pattern elements, and to reproduce an intensifying luminescence color of the other luminescence means by way of increasing the size of the corresponding pattern elements and vice versa. In that case, for a color progression, the first pattern elements that are formed for example with the first of the two luminescence means become smaller along the color progression direction, while the second pattern elements that are formed with the second of the two luminescence means increase in size at the same time. Alternatively or additionally, the quantity of the first luminescence means in each first pattern element can decrease along the color progression direction, while the quantity of the second luminescence means in each of the second pattern elements increases. Alternatively or additionally, it is also possible for the spacing between neighboring first pattern elements to increase in size along the color progression direction and at the same time for the spacing between neighboring second pattern elements to become smaller. In the former two of these three cases, the first and second pattern elements can be produced in alternation with respect to one another, while in the latter case the number of the first and second pattern elements on a given area changes along the color progression direction, and therefore a different number of pattern elements of one type is arranged depending on the location along the color progression direction between neighboring pattern elements of the other type. Alternatively, the pattern elements of different types can also be arranged in neighboring rows. The quantity of the luminescence means in a pattern element can be increased for example by printing a plurality of pattern elements with the same luminescence color on top of one another.

The pattern elements are preferably produced such that they do not overlap, but are spaced apart or at most contact one another. In the case of two pattern elements of different luminescence colors that are produced on top of one another, generally the upper pattern element would dominate. This is because, unlike in the case of the printing of conventional printing paints which absorb and remit in the visible range, the luminescence of a pattern element that is located on top can outshine the luminescence of the pattern element that is located thereunder because the excitation radiation for the bottom pattern element has possibly already been absorbed by the upper pattern element. For this reason, the bottom pattern element is no longer sufficiently excited for luminescence.

The color progression structure can be adjusted with respect to the brightness of the luminescence of the at least two merging colors by adjusting the quantity of the luminescence means of the respective type of pattern elements per unit area.

Using the arrangements of pattern elements of two different types described above, the color progression structure according to the present invention already comes about with a one-dimensional arrangement of the pattern elements along the color progression direction.

In a further preferred development of the present invention, the color progression structure is formed by a quantity of the luminescence means that continuously changes in two dimensions on the carrier surface or surfaces. The change in the quantity of the luminescence means per area in this case is the result of averaging the quantity of the two luminescence means that form the color transition across an area of a plurality of pattern elements, and not, as in the case of the above-described one-dimensional transition, across a section along the color progression direction. The color progression structure can in this alternative for example be formed by interconnected area regions in which in each case only one type of pattern elements is located.

By way of example, the color progression structure can be formed by at least two color areas which mesh in the manner of a comb in the color progression direction. In this case, the color progression structure is produced by a suitable two-dimensional relative arrangement of the two pattern element types. By way of example, the areas of one type of pattern elements alternate transversely to the color progression direction with areas of the other type of pattern elements. The comb-like meshing of these color areas is, viewed in the color progression direction, achieved for example by continuously decreasing the width thereof. A color jump then takes place in each case in the color progression direction within a row of pattern elements parallel to the color progression direction. Neighboring color areas of pattern elements which are produced with different luminescence means can have, for example, a substantially triangular shape. They extend along the color progression direction and are arranged across the entire width of the color progression. The width of the color areas (transversely to the color progression direction) should, if possible, be selected to be so small that the individual areas can no longer be resolved by the human eye. Therefore, neighboring areas are perceived as a mixed color of the areas.

The two above-mentioned embodiments for forming the color progression structure using pattern elements that are arranged in a grid can be used in the alternative. Furthermore, these two embodiments can also be combined by additionally varying the quantities of the luminescence means per unit area within the color fields which interconnect for example in the manner of a comb.

Since the luminescence intensities of the luminescence means in the pattern elements can differ, for example because the luminescence quantum yields or the excitation cross sections of the luminescence means or the concentrations of the luminescence substances in the luminescence means differ, it is possible to achieve, using a respectively matched quantity of the luminescence means per unit area on the carrier surface or surfaces, a balance for obtaining identical luminescence intensities of the luminescence colors. In order to avoid mutual outshining on account of a higher intensity of a luminescence color or a merging of individual image points of both luminescence colors, the printing process and the rastering must be matched accordingly. Any meaningful calibration of the individual luminescence colors is likewise advantageous so as to balance the different luminescence intensities and provide an appealing contrast.

In a further development of the present invention, the pattern elements that are formed with different luminescence means can be formed on different surfaces of one or more product carriers in different pattern planes such that the plurality of pattern planes in the valuable and/or security product are in each case spaced apart. As a result, further effects can be achieved since the pattern elements in different pattern planes coincide, depending on the angle under which the product is observed, in different ways and therefore bring about different color impressions. This type of construction of the valuable and/or security product assumes that at least the materials of the product that are located between the observer's eye and the pattern plane that is located the farthest therefrom are transparent or at least translucent and colorless or only slightly colored.

In principle, it is furthermore possible for a pattern that is produced from the pattern elements with luminescence means to additionally have overlaid thereon pattern elements of normal printing paints, i.e. printing paints which are not luminous or only a little luminous, but which absorb/remit in color or black-and-white or gray-and-white to produce a colored or black-and-white or gray-and-white printing image. To ensure that the absorption by these other pattern elements does not substantially interfere with the luminescence of the luminescent pattern elements, these printing paints should be of a glazing nature and/or at least not be printed such that they overlap the luminescent pattern elements. By way of example, customary printing colors according to the CYMK color space can be used by separating a multi-color representation into the color extracts according to said color space into a plurality of print extracts of individual colors that are printed individually in the product, for example, onto different surfaces. The print extracts with these printing colors can be produced in a rastered fashion, like the luminescence colors. They can also be produced with a digital printing method or alternatively a relief, intaglio, in particular offset, or screen printing method. If these printing colors are used to produce the same pattern as with the luminescence color, the patterns of both prints can be produced such that they match each other, in particular are in accurate alignment. In this case, by way of example, a rastered pattern or a line pattern that reproduces only contours in a black-and-white representation and additionally the luminescence image with the color progression structure can be printed in mutual accurate alignment, for example in order to be able to make the pattern details more easily discernable. It is also possible to print different patterns on top of one another.

The security feature according to the invention is located preferably internally in the valuable and/or security product according to the invention. To this end, it is for example initially applied onto the surface or surfaces of the product carrier or carriers, which subsequently are/is combined with one or more other sheets such that the surface or surfaces that is/are provided with the security feature is/are arranged internally. The product carrier or carriers and the sheets are then bonded in a non-detachable fashion, for example by way of laminating. The security feature can cover the entire carrier surface or surfaces or only part thereof.

The carrier material on which the pattern elements are applied (the printing material) is a constituent part of the valuable and/or security product. By way of example it is a single carrier material sheet or a plurality of carrier material sheets, which is/are combined with other carrier material sheets to form a stack and is/are then joined with these further sheets for example in a lamination method so as to form the valuable and/or security document. Alternatively, the carrier material can also be a valuable and/or security product which has already largely been finished and on the one surface or two surfaces of which the security feature is applied. Alternatively, the carrier material can additionally be coated, after the security feature has been applied, with a protective varnish such that the security feature is located inside the finished product and thus cannot be easily manipulated by third parties. The protective varnish can also impart increased abrasion and scratch resistance to the finished product. A conventional hot/cold lamination method can be used for the lamination.

The valuable and/or security product can be made of a polymer, which is selected from a group comprising polycarbonate (PC), in particular bisphenol A polycarbonate, polyethylene terephthalate (PET), the derivatives thereof, such as glycol-modified PET (PETG), polyethylene naphthalate (PEN), polyvinyl chloride (PVC), polyvinyl butyral (PVB), polymethyl methacrylate (PMMA), polyimide (PI), polyvinyl alcohol (PVA), polystyrene (PS), polyvinyl phenol (PVP), polypropylene (PP), polyethylene (PE), thermoplastic elastomers (TPE), in particular thermoplastic polyurethane (TPU), acrylonitrile/butadiene/styrene copolymer (ABS) and the derivatives thereof, and/or paper. In addition, the product can also be manufactured from a plurality of said materials. It preferably consists of PC or PC/TPU/PC. The polymers can be present in either a filled or non-filled state. In the latter case, they are preferably transparent or translucent. If the polymers are filled, they are opaque. The above details relate both to films that are to be joined to one another and to liquid formulations which are applied onto a preliminary product, such as a protective varnish. The product is preferably manufactured from 3 to 12, preferably 4 to 10 films. A laminate that is formed in such a way can finally be coated on one or both sides with a protective varnish. Overlay sheets that are formed in such a way protect a security feature that is located thereunder and/or impart the necessary abrasion resistance to the document. The security feature is preferably formed on one of the inner sheets.

The valuable and/or security document can have, in addition to the security feature according to the invention, further security features, for example colored fibers, guilloches, micro-text, holograms, kinegrams and the like. The document can furthermore also have electronic components, such as for example an RFID circuit with an antenna and RFID microchip, electronic display elements, LEDs, touch-sensitive sensors and the like. The electronic components can be arranged for example hidden between two opaque sheets of the document.

The figures described below serve for more detailed explanation of the invention.

BRIEF DESCRIPTION OF THE SEVERAL VIEWS OF THE DRAWING

In the figures, identical reference numerals designate elements having the same function.

DESCRIPTION OF THE INVENTION

Figure 1:
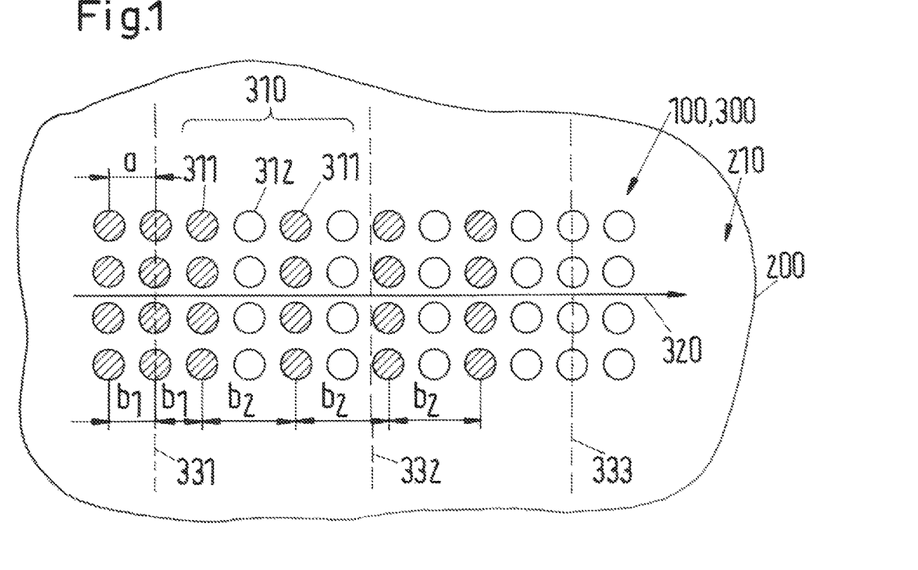
FIG. 1 shows a schematic illustration of a grid of two types of pattern elements that together form a pattern for producing a color progression structure in a first embodiment of the present invention.

The pattern 300 illustrated in FIG. 1 shows a color progression structure with a color progression direction 320. The pattern is formed from individual pattern elements 310 in regular arrangement (in a grid). The spacing a between the pattern elements within a horizontal line is identical to the grid spacing. It is formed from two types of pattern elements, specifically pattern elements of a first type (311, shown in dark) and pattern elements of a second type (312, shown in a light color). The pattern elements of the first type are formed from a first luminescence means that exhibits red luminescence under irradiation with excitation light, here UV light. To this end, the first luminescence means contains, in addition to other usual constituent parts, a pigment which consists for example of a Eu-doped oxysulfide. The second luminescence means exhibits green luminescence under irradiation with excitation light, here UV light. To this end, the second luminescence means contains, in addition to other usual constituent parts, a pigment which consists for example of a Tb-doped oxysulfide. The composition of the luminescence means is selected such that they can be printed for example onto a carrier film 200 made of polycarbonate. They are printed onto the carrier substrate using an inkjet printer.

In order to obtain a luminescence color progression from the first luminescence color (on the left with the dark pattern elements 311) to the second luminescence color (on the right with the light-colored pattern elements 312), the printed quantity of the respective luminescence means on the carrier surface 210 varies: initially, in each case three pattern elements of the first type 311 are located in the horizontal lines of pattern elements 310 as viewed from the left, and then in each case one of the two pattern element types in alternation, and finally in each case three pattern elements of the second type 312. This produces a color progression from red to green via a mixed color (orange). The spacings between pattern elements of the same type thus vary: the spacing $b_i$ between the pattern elements of the first type corresponds, as viewed from the left, initially to the grid spacing ($b_1$). Then the spacing $b_i$ increases to twice the grid spacing ($b_2$). The same applies to the pattern elements of the second type, as viewed from the right. Within the horizontal lines, the luminescence color thus changes from a purely red coloration at the left-hand side to a purely green color on the right-hand side, with the additive mixed colors between red and green, i.e. from red via orange and yellow to green, being formed between these two extremes. Coming from the left, color fronts of the same coloration, i.e. linear regions that are in each case monochrome in themselves, specifically for example a linear region 331 which appears as purely red, and then a line region 332 which appears orange, and finally a line region 333 which appears purely green, are formed (many other line regions with intermediate colors are located therebetween). Said regions are located in each case on an isochrome 331, 332, 333, i.e. a line with a coloration that is uniform in itself. This color progression does not change from horizontal line to horizontal line (from top to bottom). Therefore, the color progression direction is perpendicular to the isochromes.

Figure 2:
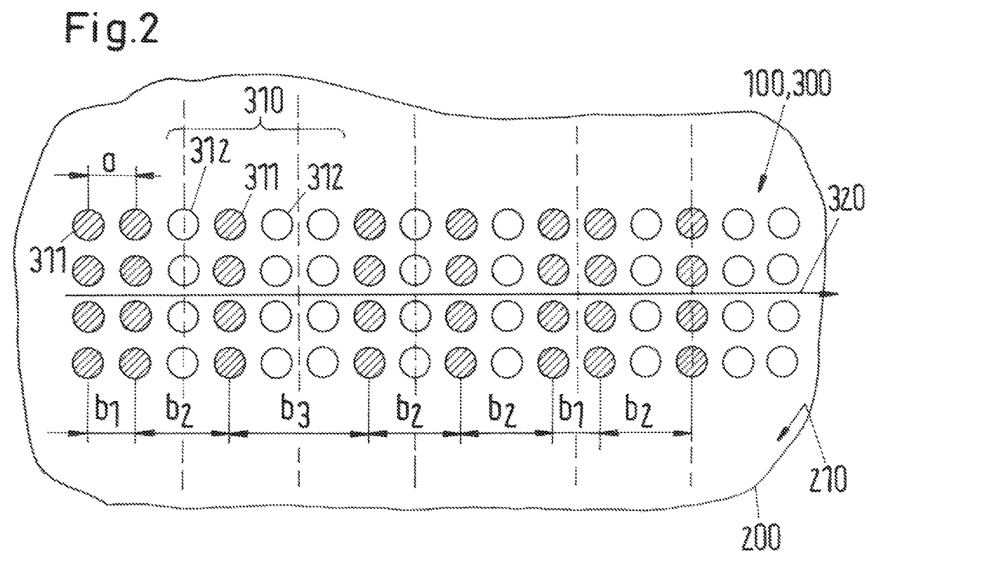
FIG. 2 shows a schematic illustration of a grid of two types of pattern elements that together form a pattern for producing a color progression structure in a second embodiment of the present invention.

FIG. 2 reproduces a further embodiment with varying spacing $b_i$ between the pattern elements of the respective types, wherein again the pattern elements of the first type 311 are formed with a red-luminescent luminescence means on the basis of, for example, Eu-doped oxysulfide, and the pattern elements of the second type 312 are formed with a green-luminescent luminescence means on the basis of, for example, Tb-doped oxysulfide: viewed from the left, the spacing $b_i$ between the pattern elements of the first type in each horizontal line varies from a grid spacing $b_1$ to twice the grid spacing $b_2$, then to three times the grid spacing $b_3$, then again to twice the grid spacing $b_2$, once again to a single grid spacing $b_1$, and finally again to twice the grid spacing $b_2$. The same is true for the pattern elements of the second type 312, viewed from the right. This produces a color progression in which, starting from a purely red color (left), first a mixed color with equal proportions of red and green, thereafter a mixed color with a greater proportion of green, thereafter a mixed color with identical proportions of red and green, then a mixed color with a greater proportion of red, then a mixed color with equal proportions of red and green, and finally a purely green color are produced. Thus, with a suitable arrangement of the two types of pattern elements, not only is a continuous transition with a progressive change from one luminescence color to another possible, but also continuous alternation between a plurality of mixed colors within the color progression. This color progression does not change from horizontal line to horizontal line (from top to bottom). Locations of identical color impression (isochromes) are thus located one under the other along a perpendicular line such that straight lines with the same color impression are produced.

Figure 3:
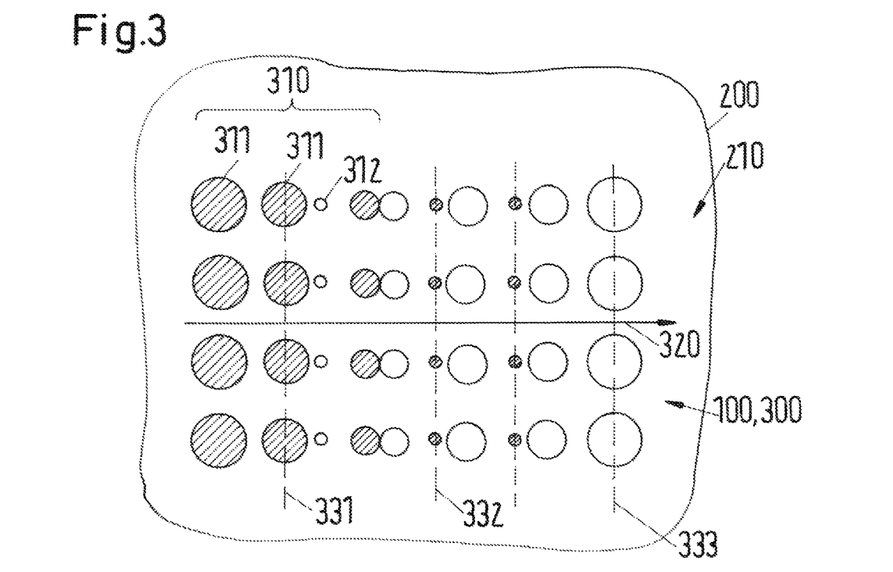
FIG. 3 shows a schematic illustration of a grid of two types of pattern elements that together form a pattern for producing a color progression structure in a third embodiment of the present invention.

FIG. 3 represents a further embodiment for the reproduction of a color progression with two different types of pattern elements 310. In this case, too, the quantity of the luminescence means per unit area is printed on the carrier surface 210 such that it varies. The pattern elements of the first type 311 are formed with a red-luminescent luminescence means on the basis of, for example, Eu-doped oxysulfide, and the pattern elements of the second type 312 are formed with a green-luminescent luminescence means on the basis of, for example, Tb-doped oxysulfide. Coming from the left in the color progression direction 320, initially a large quantity of the first luminescence means per pattern element and thus per unit area is printed, and no second luminescence means. This is achieved in that the pattern elements that are formed by the first luminescence means are very large on account of large ink droplets being printed onto the carrier substrate. Toward the right, increasingly small pattern elements are then produced with the first luminescence means, while at the same time pattern elements with the second luminescence means that increase in size are printed. This progression is repeated in every horizontal pattern element line, such that the luminescence color progression in each of these lines is identical. Within the lines, the luminescence color thus changes from a purely red coloration on the left-hand side toward the right to a purely green color, with all additive mixed colors between red and green, i.e. from red via orange to green, being produced between said two extremes. Coming from the left, color fronts of identical coloration, i.e. linear regions which are monochrome in each case in themselves, specifically for example a linear region 331 which appears purely red, then a line region 332 which appears in a mixed color between red and green, and finally a line region 333 which appears green, are formed (many other line regions with intermediate colors are located therebetween). Said regions are located in each case on an isochrome 331, 332, 333.

Figure 4:
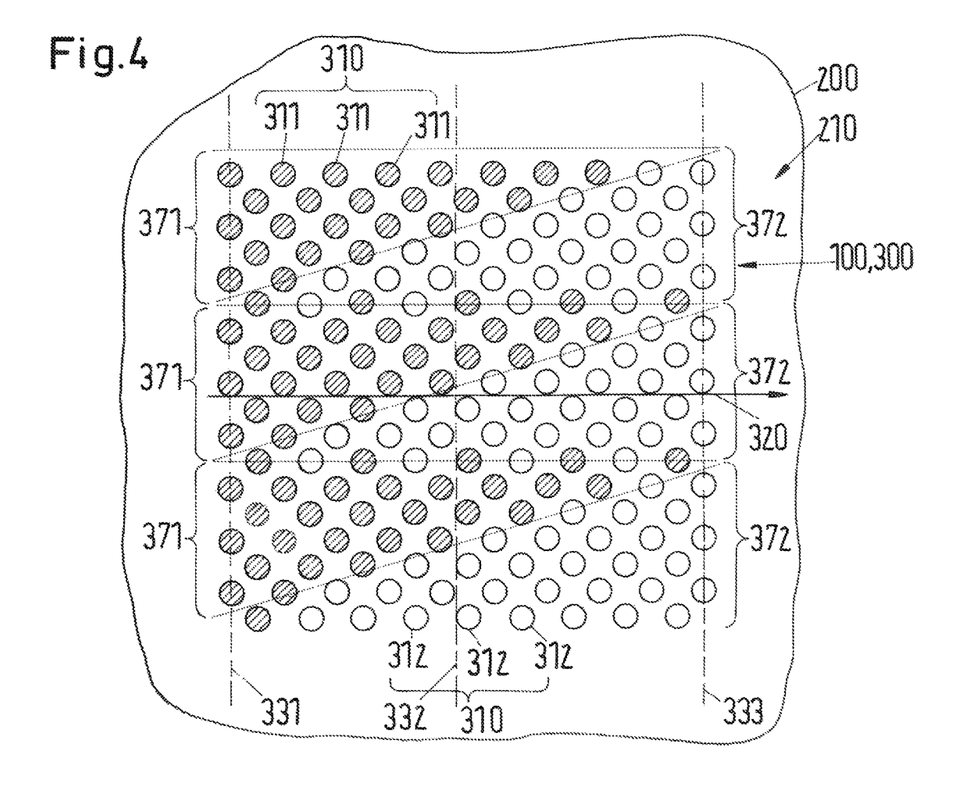
FIG. 4 shows a schematic illustration of a grid of two types of pattern elements that together form a pattern for producing a color progression structure in a fourth embodiment of the present invention.

With the abovementioned types of grid arrangement of the pattern 300 a color progression structure is obtained that is already formed within a single horizontal line. FIG. 4 schematically illustrates a further embodiment for a pattern 300 of pattern elements 310 arranged in a grid made of two luminescence means that exhibit luminescence in different colors. In this case, too, the first luminescence means is, like the luminescence means used in FIG. 1, red on account of it containing, for example, a Eu-doped oxysulfide as the luminescence substance. The second luminescence means is, like the second luminescence means used in FIG. 1, green on account of it containing, for example, a Tb-doped oxysulfide as the luminescence substance.

The pattern elements of the first type 311 and the pattern elements of the second type 312 are in each case arranged in triangular structures (fields) 371, 372, which mesh. The respective tips of the triangles of one type 371 extend between the triangles of the other type 372 and vice versa. Since the width of the triangles for example at their base is so narrow that a human eye cannot individually detect these on account of insufficient resolution, an observer will perceive mixed luminescence colors which are, depending on the location of the isochromes 331, 332, 333, orange or yellow between the two basic colors red and green. For a sufficiently wide color progression structure in relation to their length, the triangles should be configured to be very much narrower than shown in FIG. 3 since the width should be below the resolution capability of the human eye, and the length thereof specifies the width of the color progression structure. The resulting color impression thus gives a color transition from red via orange to green, with all mixed colors also being formed between said colors along the color progression direction 320.

Figure 5:
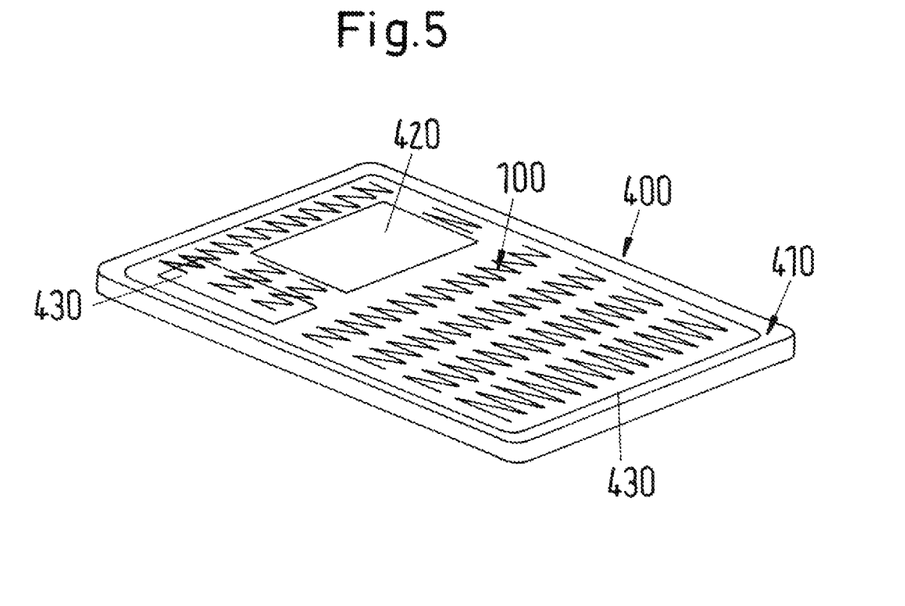
FIG. 5 shows a valuable and/or security document according to the invention in the form of a personal ID in a perspective representation with a security feature according to the invention.

The valuable and/or security product 400 according to the invention having the security feature 100 according to the invention is shown in FIG. 5. The product is configured in the form of a card and serves as a personal ID. It has a front side 410 and a rear side (not visible). The front side is provided, in a field 420, with a facial image of the person with whom the card is associated. Furthermore located on the front side is a field 430, in which personal data of said person is entered in clear writing and in coded (machine-readable) form with alphanumeric characters. Almost the entire surface of the front side of the card is additionally covered by the security feature 100 that forms a multi-colored color progression structure. The security feature is located on a product carrier also within a field 430, which extends, except for a narrow margin and the field covered by the facial image, across the entire front side of the card. The color progression structure is present also in the region of the field containing the personal data. Since the product carrier forms a sheet within a laminate that forms the card, the rastered color progression is located on an internal surface inside the card. To ensure that the color progression can be seen from the front side, the front sheets of the laminate are transparent and colorless. The appearance of the front side of the card is dominated by the color progression structure in a characteristic manner. The personal data which is present as black writing can be read easily against the background of the color progression structure.

The invention claimed is:

1. A security feature for a valuable and/or security product, comprising: a pattern formed on at least one carrier surface, said pattern having a color progression structure produced by a digital printing method from pattern elements arranged in a grid; said pattern elements having dimensions rendering said pattern elements invisible to the naked human eye without technical aids; said color progression structure being formed of at least two luminescence media that exhibit spectrally different luminescences; wherein said color progression structure is formed by a quantity of the respective luminescence media per unit area of the at least one carrier surface that substantially continuously changes along a color progression; and wherein the respective quantity of said luminescence media per unit area of the at least one carrier surface is adjusted by way of at least one parameter selected from the group consisting of: a size of said pattern elements, a quantity of said luminescence media per pattern element, and a spacing between said pattern elements.

2. The security feature for a valuable and/or security product according to claim 1, wherein said color progression structure is formed in a one-dimensional arrangement of said pattern elements along a color progression direction.

3. The security feature for a valuable and/or security product according to claim 1, wherein said color progression structure is formed by a two-dimensional arrangement of said pattern elements.

4. The security feature for a valuable and/or security product according to claim 3, wherein said color progression structure is formed by at least two color areas that mesh in a comb shape along a color progression direction.

5. The security feature for a valuable and/or security product according to claim 1, wherein said luminescence media include a first luminescence medium containing a Tb-doped host lattice and a second luminescence medium containing a Eu-doped host lattice.

6. The security feature for a valuable and/or security product according to claim 1, wherein said color progression structure has the characteristics of having been produced by an inkjet printing method.

7. A valuable and/or security product, comprising:
a product carrier; and
at least one security feature according to claim 1 disposed on or in said product carrier.

* * * * *